A. R. PRIBIL.
VALVE.
APPLICATION FILED MAR. 18, 1912.
1,068,927. Patented July 29, 1913.
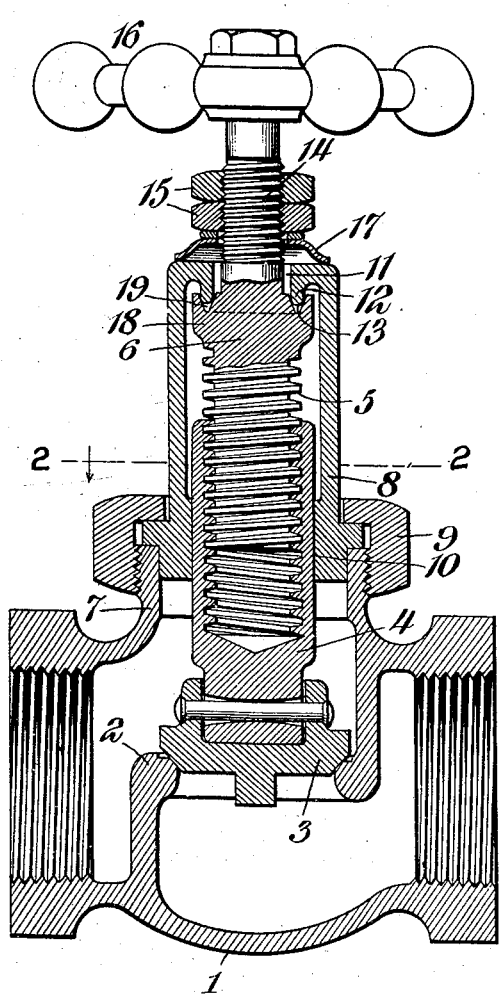
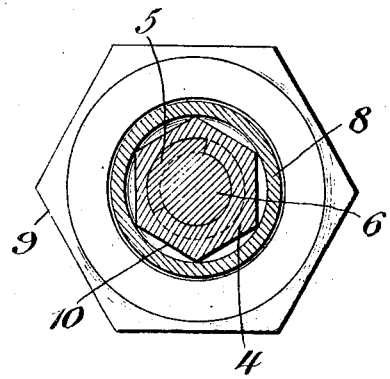
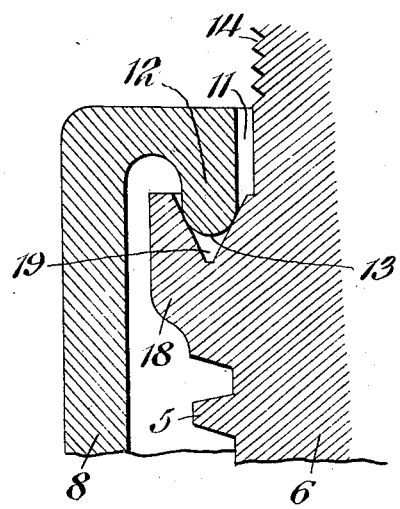
WITNESSES
Howard D. Orr
F. T. Chapman
Alexis R. Pribil,
INVENTOR,
BY E. G. Siggers
ATTORNEY

UNITED STATES PATENT OFFICE.

ALEXIS R. PRIBIL, OF DETROIT, MICHIGAN, ASSIGNOR TO PENBERTHY INJECTOR CO., OF DETROIT, MICHIGAN, A CORPORATION OF MICHIGAN.

VALVE.

1,068,927. Specification of Letters Patent. Patented July 29, 1913.

Application filed March 18, 1912. Serial No. 684,530.

*To all whom it may concern:*

Be it known that I, ALEXIS R. PRIBIL, a citizen of the United States, residing at Detroit, in the county of Wayne and State of Michigan, have invented a new and useful Valve, of which the following is a specification.

This invention has reference to improvements in valves, and its object is to provide a fluid tight seal for the valve stem where passing through the bonnet of the valve, which shall become automatically fluid tight without the use of any of the packings commonly employed for the purpose.

The valve as a whole may be of any suitable type, since the valve casing, valve seat and valve member coacting with the seat and the general means for operating the valve member to close the device against the passage of fluid, or to open it for the passage of fluid form no part of the present invention, which latter comprises a means whereby the valve stem where emerging from the valve bonnet is provided with a fluid seal so arranged that while the valve stem is quite free to be turned as desired, still the escape of fluid under pressure about the valve stem is prevented by an accumulation of liquid, such as water, by condensation or otherwise, which is pocketed in the path of fluid under pressure tending to escape in a manner preventing such escape while the resistance to the turning of the valve stem present when compressed packing is employed is wholly avoided.

The invention will be best understood from a consideration of the following detailed description, taken in connection with the accompanying drawing forming a part of this specification, with the further understanding that while the invention is shown in the drawings in practical form, it is by no means limited to any exact conformity with the showing of the drawings, since the invention may be used with other types of valves than the particular type shown in the drawing and may be variously changed and modified so long as such changes and modifications mark no material departure from the salient features of the invention.

In the drawings:—Figure 1 is a longitudinal diametric section of a known type of valve with the invention applied, some parts being shown in elevation. Fig. 2 is a section on the line 2—2 of Fig. 1 with distant parts omitted. Fig. 3 is a fragmentary section on a larger scale than the other figures, of the portion of the valve structure wherein the present invention is located.

Referring to the drawings, there is shown a member 1 constituting the body or casing of a valve of the globe type and as the structure of such portion of valves of this type is well known detailed description of the valve is deemed unnecessary. Within the casing 1 there is formed a valve seat 2 to which is adapted a closing member 3 usually referred to as a valve. The member 3 is carried by an axially movable non-rotative stem member 4 having internal screw threads with which there is engaged the externally threaded end 5 of a valve stem 6. The casing 1 is formed as usual with a neck 7 at one side in line with a valve seat 2, and this neck 7 has secured thereto a valve bonnet 8 by a clamp ring 9 as is customary in valves of the type illustrated. The exterior of the non-rotatable valve stem member 4 is made non-circular and in the particular illustration of the drawing is made hexagonal, as indicated at 10, while the portion of the bonnet 8 traversed by the member 4 is similarly shaped to permit axial movement of the member 4 but prevent rotation thereof about its longitudinal axis.

That end of the bonnet 8 remote from the neck 7 has an axial passage 11 therethrough of less diameter than the internal diameter of the bonnet, and about this passage the bonnet is formed with an annular bead 12 directed toward the end of the bonnet attached to the neck 7. Because of the direction of projection of the bead 12 and its annular form it may be termed an inward axially extending bead ring immediately surrounding the valve stem passage 11 in the bonnet 8 in spaced relation to the inner wall of the bonnet. Furthermore, the free end of the bead 12 is rounded, as indicated at 13, although such rounded form in cross section is not mandatory so long as the functions hereinafter set forth are accomplished.

That portion of the valve stem 6 exterior to the bonnet 8 is screw threaded, as indicated at 14, and there receives nuts 15 beyond which the stem receives a manipulating hand wheel 16 of any approved form. The nuts 15 engage a spring tension washer 17 and hold the same against the corresponding or outer end of the bonnet 8 with a force which may be adjusted by the nuts 15, one of which is employed to tension the spring washer and the other of which serves as a lock nut. That portion of the valve stem 6 within the bonnet 8 adjacent the bead ring 12 is laterally enlarged as indicated at 18, and that end of the enlargement presented toward the bead 12 is formed with an annular groove 19 shown as of approximately V-shape in cross section, but such shape is not mandatory so long as the functions hereinafter set forth are accomplished. The groove 19 forms an annular bucket or pocket in position to receive the end 13 of the bead 12 and the bead and groove are so related that the bead will enter the bucket or pocket formed by the groove to an extent less than the depth of the groove and will engage the walls of the groove at diametrically different points with respect to the axis of the groove, so that the bead and walls of the grooves coact to form a substantially closed chamber within the narrow portion of the groove, while the groove when of substantially V-shape in cross section serves to center the valve stem with relation to the bead, the bead and groove being held in contact by the action of the spring washer 17.

The valve stem member 4 fits easily in the passage provided therefor in the bonnet 8, and consequently fluid under pressure may find its way into the interior of the bonnet 8 and ultimately to the enlargement 18, from whence it tends to flow by way of the groove 19 about the bead 12 and out of the bonnet through the passage 11. If it be assumed that steam or water be the fluid passing through the valve, then in the case of steam condensation occurs, and in either case any tendency of the fluid to pass by the bead 12 will cause a pocketing of water in that portion of the V-groove closed in by the bead 12, wherefore this portion of the groove forms an annular pocket or bucket for water and the capillary attraction of the contacting surfaces of the bead and walls of the groove for the water causes the latter to effectually resist any tendency of the fluid under pressure to blow out at these points. The seal is actually double, being present at both walls of the groove where engaged by opposite sides of the end 13 of the bead 12. That portion of the groove 19 closed in by the bead 12 may ultimately become filled with water or other liquid and, therefore, both lines of contact of the bead with the walls of the groove are maintained constantly wet, not only effectually sealing the interior of the bonnet against the escape of steam or water or other fluid under pressure through the passage at the corresponding end of the bonnet provided for the exit of the valve stem, but this liquid seal may also serve as a lubricant, thus to a corresponding extent reducing the frictional resistance to the turning of the valve stem at the points of engagement of the bead 12 with the walls of the groove 19. It is to be observed that the bead 12 engages the walls of the groove 19 only at spaced points, leaving within the groove an annular chamber in the form of a bucket or pocket designed to contain a suitable amount of liquid to cause the sealing both adjacent to the interior of the bonnet and to the passage through which the valve stem extends to the exterior of the bonnet.

The present invention is applicable to valves where the manipulating end of the valve stem rotates but does not move progressively, and where the closing member of the valve moves progressively but does not rotate.

What is claimed is:—

1. A valve provided with a rotatable valve stem, a bonnet through which the stem extends, and means for holding the stem against longitudinal movement while being rotated, said stem and bonnet having coacting parts, one entering the other and together shaped to define a substantially closed pocket for receiving and retaining liquid in sealing relation to said coacting parts.

2. A valve provided with a bonnet and a rotatable valve stem traversing said bonnet and having means for holding it against axial movement, the bonnet and valve stem being provided with coacting parts contacting at spaced points and shaped to define a pocket between said spaced points positioned with relation to the valve to receive liquid by gravitation, and one of said parts being rotatable with the valve stem with respect to the other part, whereby liquid in said receptacle will constitute a liquid seal against passage of fluid under pressure from the interior of the bonnet to the exterior thereof through the pocket, and the liquid will also act as a lubricant for said coacting parts.

3. A valve provided with a bonnet and a valve stem traversing said bonnet and extending to the exterior thereof, one of said members being provided with an integral axially extended bead and the other with a groove formed in an integral portion thereof and opening upwardly when the valve is in the upright position and entered and engaged by the bead at radially different distances from the longitudinal axis of the valve stem, the points of engagement being in spaced relation to the bottom of the groove.

4. A valve having a bonnet with an axially extended interior annular bead, and a valve stem extending through the bonnet and provided with a laterally enlarged portion having an annular groove opening upwardly when the valve is in an upright position and entered by the bead, the groove having the side walls approaching toward the bottom and the bead being rounded to engage concentric portions of the walls of the groove, and means for constantly retaining the bead in engaged relation with the walls of the groove, the valve stem being rotatable without longitudinal movement.

5. A valve having a rotatable valve stem, and a bonnet through which the valve stem extends, said bonnet having an axially extended interior annular bead about the valve stem and the latter being provided with an annular groove adapted to receive the bead and of a shape to receive the bead for but a portion of the depth of the groove, and means for retaining the bead in engaging relation with the walls of the groove, said means comprising an elastic member, and adjusting means on the valve stem, said elastic member engaging the bonnet.

6. A valve provided with a bonnet having an interior bead concentric with the longitudinal axis of the bonnet, a valve stem provided with an annular enlarged portion having a groove therein with approaching walls adapted to receive the bead and contact therewith at radial spaced portions, and means in operative relation to the valve stem and bonnet and exterior to the latter for holding the bead and walls of the groove in constant engagement.

In testimony, that I claim the foregoing as my own, I have hereto affixed my signature in the presence of two witnesses.

ALEXIS R. PRIBIL.

Witnesses:
LOUIS F. MILLS,
RANDALL H. MITCHELL.

---

Copies of this patent may be obtained for five cents each, by addressing the "Commissioner of Patents, Washington, D. C."